United States Patent [19]
Conley, Jr. et al.

[11] Patent Number: 5,999,193
[45] Date of Patent: Dec. 7, 1999

[54] METHOD AND SYSTEM FOR GENERATING COLOR INDICIA CODED BAR GRAPHS WHICH USUALLY CONVEY COMPARISONS WITH THRESHOLD VALUES AND FOR GENERATING COMPARATOR LINES FOR USE WITH SUCH BAR GRAPHS

[75] Inventors: Ralph F. Conley, Jr., Miamisburg; Xiaohong Wu, Beavercreek, both of Ohio

[73] Assignee: Direct Business Technologies, Inc., Centerville, Ohio

[21] Appl. No.: 08/787,302

[22] Filed: Jan. 24, 1997

Related U.S. Application Data
[60] Provisional application No. 60/010,547, Jan. 25, 1996.

[51] Int. Cl.$^6$ .............................. G06F 3/14; G06T 11/40
[52] U.S. Cl. ...................... 345/440; 345/140; 707/503
[58] Field of Search ........................... 707/503; 345/440, 345/140

[56] References Cited

U.S. PATENT DOCUMENTS

| | | | |
|---|---|---|---|
| 4,835,526 | 5/1989 | Ishii et al. ................................. | 345/145 |
| 5,553,212 | 9/1996 | Etoh et al. ............................... | 707/503 |
| 5,581,677 | 12/1996 | Myers et al. ............................ | 345/440 |
| 5,581,678 | 12/1996 | Kahn ........................................ | 345/440 |
| 5,611,034 | 3/1997 | Makita ..................................... | 345/440 |
| 5,675,760 | 10/1997 | Houwen et al. ........................ | 345/440 |
| 5,918,217 | 6/1999 | Maggioncalda et al. ................ | 705/36 |
| 5,918,238 | 6/1999 | Hayashi .................................. | 707/526 |

OTHER PUBLICATIONS

James, Robert C. et al. "Mathematics Dictionary: Fifth Edition", New York: Van Nostrand Reinhold, pp. 35–36, Jan. 1992.

*Primary Examiner*—Mark R. Powell
*Assistant Examiner*—Jeffrey Allen Rossi
*Attorney, Agent, or Firm*—Jacox, Meckstroth & Jenkins

[57] ABSTRACT

A system and method for creating at least one intelligent chart is shown comprising a computer having indicia means and a comparator line generator which are capable of generating intelligent, indicia-coded charts which are coded based on performance relative to pre-established thresholds. The system and method further comprise a comparator line generator for generating comparator lines which represent, for example, industry standard data or information. The system and method enable a user to quickly and accurately interpret and review data represented by the visual objects in the chart, as well as a company's performance relative to, for example, an industry standard.

25 Claims, 12 Drawing Sheets

Process Routine

Display/Graph Chart Routine

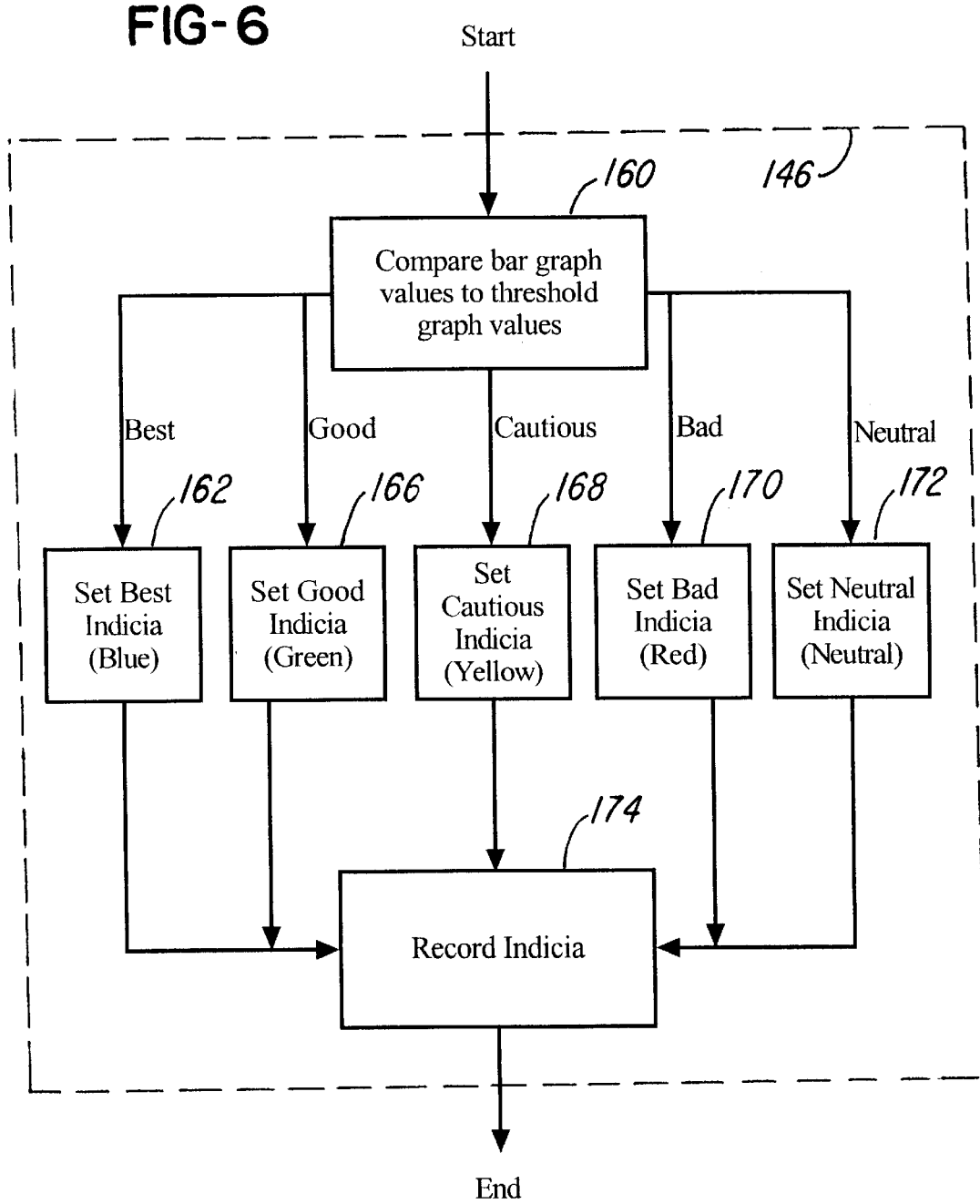

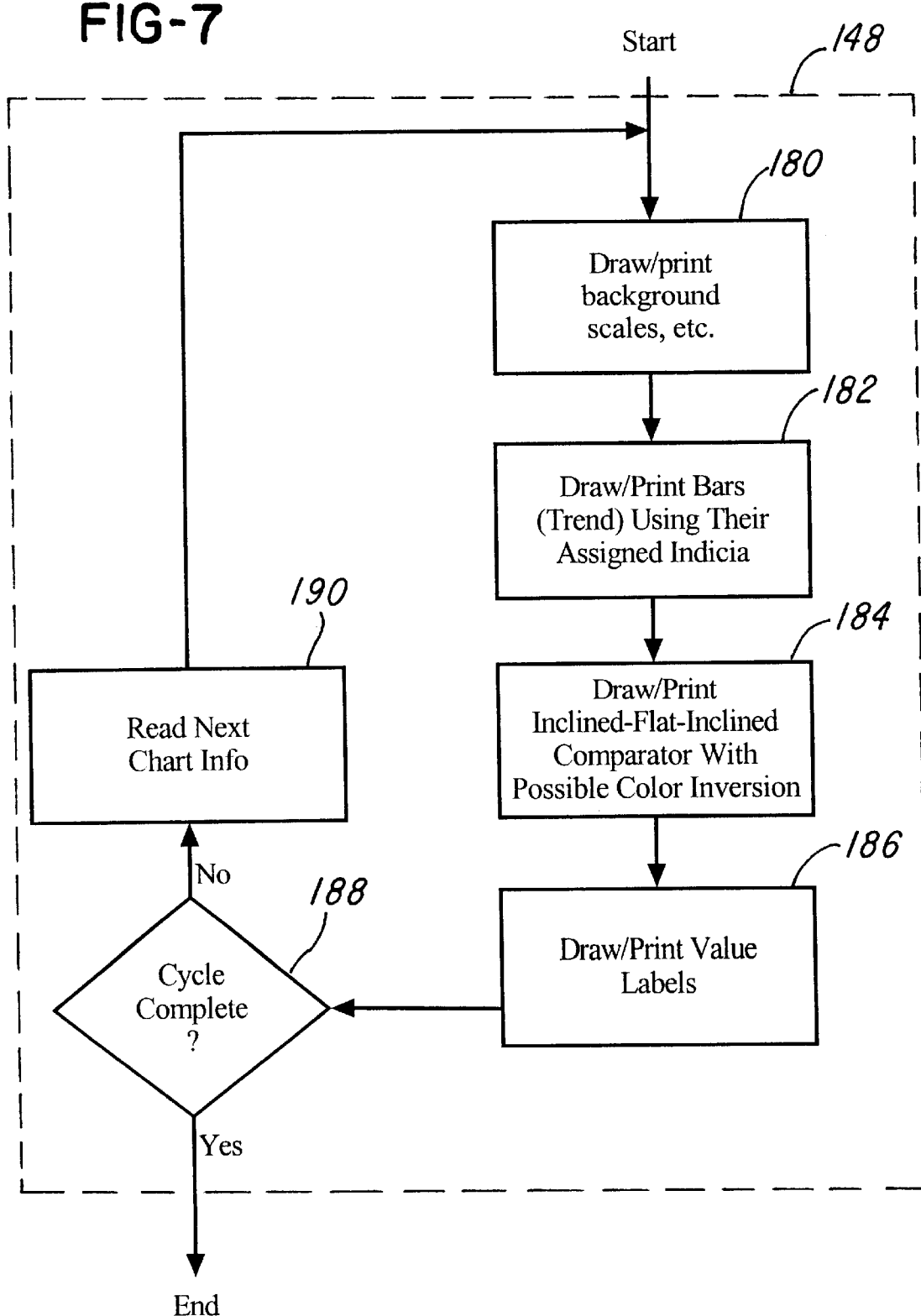

FIG-8

DATA MANAGER

CATEGORY [ASSETS ▼]  DETAIL LEVEL [FULL DETAIL ▼]  K FOR THOUSANDS
                                                   M FOR MILLIONS
                                                   B FOR BILLIONS

COLLAPSE ALL          <=NOV 1995    DEC 1995=>

| | NOV 1995 | DEC 1995 |
|---|---|---|
| ☐ ASSETS | 1,989,000 | 1,989,000 |
| ☐ CUR ASSETS | 929,000 | 939,000 |
| ├ CASH & EQUIV | 422,000 | 425,000 |
| ├ RECEIVABLES | 102,000 | 104,000 |
| │ ├ TRADE RECEIV | 80,000 | 83,000 |
| │ └ OTHER RECEIV | 22,000 | 21,000 |
| ├ INVENTORY | 105,000 | 110,000 |
| ├ SECURITIES | 200,000 | 200,000 |
| └ OTHER CUR ASSETS | 100,000 | 100,000 |
| ☐ FIXED ASSETS-NET | 1,010,000 | 1,000,000 |
| ├ PROP, EQUIP & LAND | 1,500,000 | 1,500,000 |
| └ DEPRECIATION | 490,000 | 500,000 |
| ├ INTANGIBLE | 0 | 0 |
| └ OTHER NON-CUR ASSETS | 50,000 | 50,000 |
| ☐ LIABILITIES | 1,032,000 | 1,008,000 |

[UPDATE ALL]  [UPDATE]  [SAVE]  [CANCEL]  [OK]

FIG-11

CHART SETUP — BAR NAMES, DATA TYPE AND LEGEND TITLES — 14a3

TO ADD A BAR INTO CHART, TYPE IN THE NAME & PRESS ENTER. TO SET THE DATA TYPE OF A BAR, SELECT BAR, THEN SELECT A TYPE.

ENTER BAR NAMES IN THE BAR GROUP (84)
- CURRENT RATIO
- CURRENT RATIO

DATA TYPE (88)
- ○ CURRENCY   ○ PERCT
- ● RATIO      ○ NUMBR

LEGEND TITLE FOR THE BAR (86)
- CUR ASSETS/CUR LIAB

[DELETE] [CLEAR ALL]

[<BACK] [NEXT>] [CANCEL] [HELP]

FIG-12

CHART SETUP — BAR VALUES ON FORMULAS — 14a4

BAR NAMES IN THE BAR GROUP (90)
- CURRENT RATIO

YOUR ACCOUNT LEDGER (96)
- ⊞ ASSETS
- ⊞ LIABILITIES
-    EQUITY
- ⊞ INCOME (97)
- ⊞ COST OF SALES
- ⊞ EXPENSES
- ⊞ INTEREST & TAXES

Operators (91): ( ) + − × + x

EXISTING FORMULAS (94)
[ ▼ ]
(...)

BAR VALUES OR FORM
- CUR ASSETS/CUR LIAB (92)

[<BACK] [NEXT>] [CANCEL] [HELP]

FIG-13

CHART SET UP THRESHOLDS

BARS OF THE BAR GROUP

CURRENT RATIO

YOUR ACCOUNT LEDGER

- ⊞ ASSETS
- ⊞ LIABILITES
  EQUITY
- ⊞ INCOME
- ⊞ COST OF SALES
- ⊞ EXPENSES
- ⊞ INTEREST & TAXES

C | P | ( | ) | + | · | x | ÷ | >

THRESHOLDS
INCREASE BETTER
DECREASE BETTER

VALUE OF FORMULA

BC CURRENT RATIO 1.1

BC CURRENT RATIO 1.05

BC CURRENT RATIO f(x) | (...) | LT

NO THRESHOLDS

LEGEND TITLES

< 10% OVER BANK COMPLIANCE

< 5-10% OVER COMPLIANCE

< 0-5% OVER COMPLIANCE

< BELOW BANK COMPLIANCE

<BACK | NEXT> | CANCEL | HELP

FIG-14

CHART SETUP COMPARATOR NAMES

ENTER YOUR COMPARATOR NAMES

LAST YEAR

CAMPARATORS YOU HAVE ENTERED

BANK COMPLIANCE
INDUSTRY AVERAGE
LAST YEAR

DELETE | DELETE ALL

LEGEND TITLE SELECTED COMPARATOR

COLOR
- ○ BLUE
- ○ GREEN
- ● YELLOW
- ○ RED

DATA TYPE
- ○ CURRENCY
- ● RATIO
- ○ PERCENTAGE
- ○ NUMBER

<BACK | NEXT> | CANCEL | HELP

METHOD AND SYSTEM FOR GENERATING COLOR INDICIA CODED BAR GRAPHS WHICH USUALLY CONVEY COMPARISONS WITH THRESHOLD VALUES AND FOR GENERATING COMPARATOR LINES FOR USE WITH SUCH BAR GRAPHS

This application claims priority to U.S. provisional application No. 60/010547 of Jan. 25, 1996.

BACKGROUND OF THE INVENTION

1. Field of the Invention

This invention relates to a system and method for generating charts, and more particularly, a system and method for generating intelligent visual object charts which are indicia-coded and which comprise comparator lines for facilitating immediate interpretation and review of data presented in the charts.

2. Description of Related Art

For sometime, there have been programs to generate charts, graphs and spreadsheets to visually represent data. One commonly used program is the Excel software program available from Microsoft Corporation of Redmond, Wash. One of the drawbacks of the programs of the past is that, while they generated visual object charts and spreadsheets, they did not use any means or indicia for identifying whether data represented by the visual objects in the chart was favorable, not favorable, or neutral.

The prior art systems sometimes generated colored visual objects in the chart, but the color was only used to distinguish one visual object from another. There was no indicia or color used to illustrate whether the visual objects, or more particularly, whether the data represented by the visual objects was favorable, unfavorable, neutral or the like. In short, the visual objects were not encoded with indicia showing, for example, a company's performance relative to known or predetermined thresholds.

Another problem with prior art systems is that they did not readily provide comparator information for providing means for quickly and conveniently comparing the data represented by the visual objects to, for example, an industry standard. Thus, while lines were sometimes used in conjunction with visual objects, it was often difficult to interpret the data at points where the lines intersected the visual objects because the line typically had a slope at the points where the line intersected the visual object.

What is needed, therefore, is a system and method for generating intelligent charts having indicia-coded visual objects which are coded based on predetermined thresholds. What is also needed is a system and method for generating comparator lines which are easy to interpret at points where the lines intersect the visual objects in the chart.

SUMMARY OF THE INVENTION

It is, therefore, a primary object of the invention to provide a system and method for generating intelligent charts having indicia-coded visual objects.

It is another object of the invention to provide an intelligent chart having comparator lines which, when used with visual objects, are easy to read and understand.

Still another object of the invention is to provide a system and method for generating an intelligent, indicia-coded chart having comparator lines and associated legends which can be automatically generated.

In one aspect, this invention comprises a method for creating at least one intelligent chart comprising the steps of inputting a plurality of chart components comprising at least one of the following: a chart name, a chart footing or a chart heading, a visual object name, a legend title for a legend for the visual object, inputting data to be charted, inputting a plurality of visual object values and a plurality of threshold values, assigning intelligent indicia to each of the plurality of threshold values, generating at least one intelligent chart comprising a plurality of indicia-coded visual objects using the plurality of chart components, plurality of visual object values, the plurality of threshold values and the intelligent indicia.

In another aspect, this invention comprises a method for electronically generating at least one intelligent color-coded chart, the method comprising the steps of: inputting user data into a processor, loading a plurality of visual object formulas and threshold ranges into the processor, assigning a color to each of the plurality of threshold ranges, processing the input data using the plurality of visual object formulas to provide a plurality of graph values, comparing the plurality of graph values to the threshold ranges and generating the intelligent color-coded visual object charts in response to the comparing step.

In still another aspect, this invention comprises a system for electronically generating at least one intelligent color-coded visual object chart, the system comprising a computer, a user interface for inputting user data into the computer, a storage device coupled to the computer for storing a plurality of visual object formulas and a plurality of threshold formulas, indicia means situated in the computer for assigning at least one color to a plurality of threshold ranges defined by the plurality of threshold formulas, the computer processing the user data using the plurality of visual object formulas to provide a plurality of graph values and comparing the plurality of graph values to the plurality of threshold ranges and also generating at least one intelligent color-coded visual object chart in response thereto.

Other objects and advantages of the invention will be apparent from the following description, the accompanying drawings, and the appended claims.

BRIEF DESCRIPTION OF THE ACCOMPANYING DRAWINGS

FIG. 6 is a schematic of the assign indicia routine shown in block 146 in FIG. 5;

FIG. 7 is a schematic of a draw/print chart routine according to block 148 in FIG. 5;

FIG. 8 is a plan view of a user interface for inputting user data into the computer;

FIG. 11 is a plan view of a user interface for further inputting chart setup information into the computer;

FIG. 12 is still another plan view of another user interface for inputting chart setup visual object formulas/values into the computer;

FIG. 13 is another plan view of a user interface for inputting threshold information into the computer;

FIG. 14 is a plan view of another user interface for inputting comparator information for one or more comparator lines into the computer.

DETAILED DESCRIPTION OF THE PREFERRED EMBODIMENT

Figure 1:
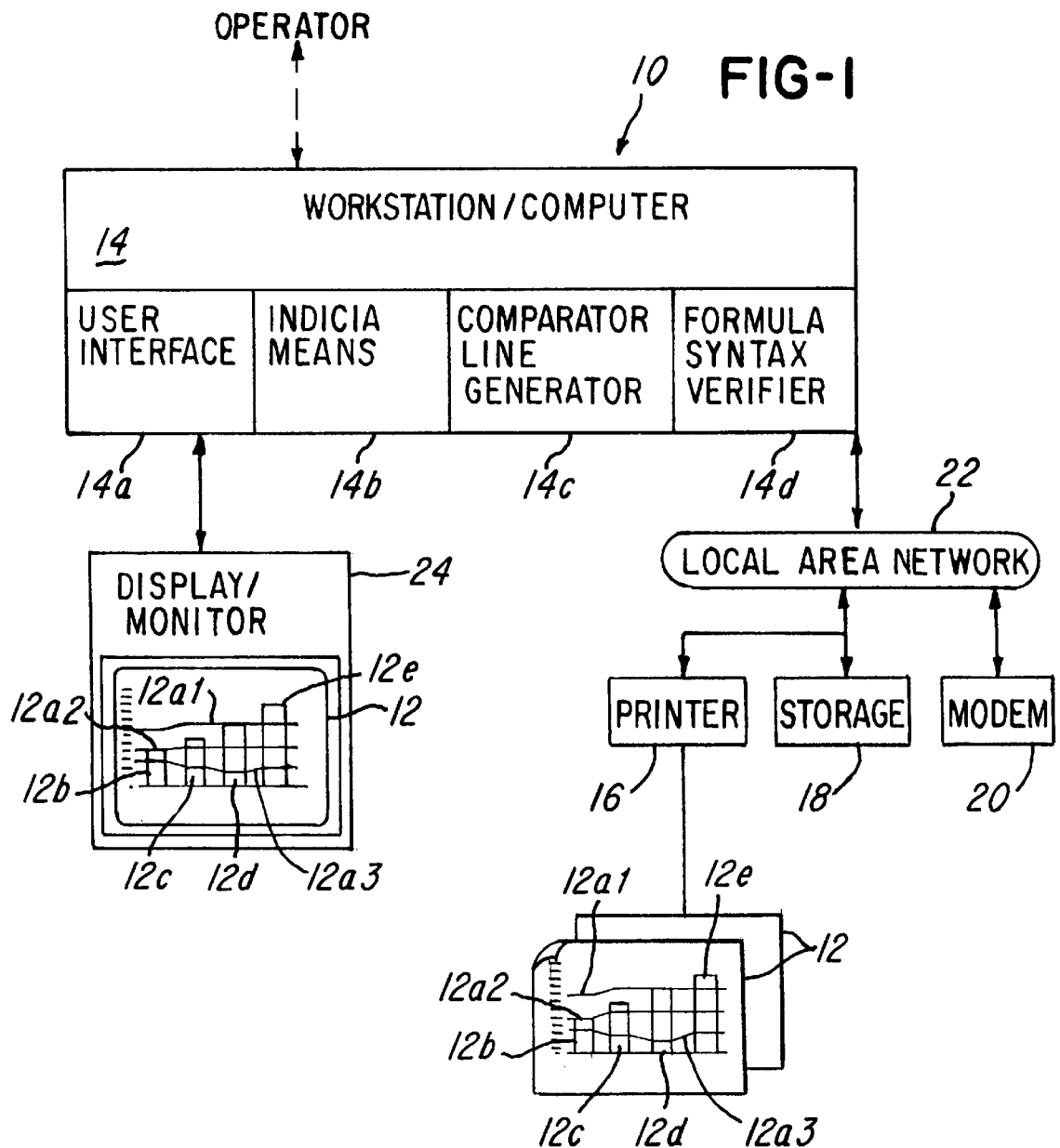
FIG. 1 is a schematic of a system according to one embodiment of the invention.

Referring now to FIG. 1, a system 10 for electronically generating at least one intelligent, color-coded visual object chart or charts 12 is shown comprising a computer or processor 14 which is coupled to a printer 16, a storage device 18 and a modem 20 either directly or through a local area network 22 as shown. In the embodiment being described, the computer 14 is a conventional computer having a PC with 486 processor or higher and having 8 megabytes of memory running a Windows 95 or Windows NT (version 3.51 or later) operating system available from Microsoft Corp. The printer 16 comprises a HP Deskjet 1200 (color). The modem 20 comprises a U.S. Robotics Sportster 28,800 fax/modem available from U.S. Robotics. Although not shown, the modem 20 may permit the charts 12 to be transmitted, for example, to other communication networks (not shown), over the Internet (not shown), to other databases or computers (not shown), and the like. The computer 14 is also coupled to a display 24 for electronically displaying the charts 12 so that they may be visually observed by an operator.

In the embodiment being described, the computer 14 comprises a user interface or interface means 14a for generating various user interface screens, such as interfaces 14a1–14a8 shown in FIGS. 8–15, respectively, for facilitating generating chart 12. As will be described later herein, the user interface means 14a facilitating inputting of information necessary to generate at least one intelligent color-coded visual object chart 12 in the manner described herein.

For example, FIG. 8 shows a data entry user interface screen 14a8 electronically generated by user interface 14a for selecting a data category 120, such as "assets", and for inputting user data, such as the financial data 135 and 121, relative to the selected category. User interface also comprises an update all button 122, update button 124, save button 126, cancel button 128 and okay button 130 which may be selectively activated by conventional means, such as a mouse (not shown) coupled to computer 14. For ease of illustration, the invention will be described using financial information for a company, but the invention may be used with other types of data as well.

The computer 14 further comprises an indicia labeler or indicia means 14b for assigning at least one indicia, such as a color, using a plurality of threshold ranges defined by a plurality of threshold formulas 28a–28c (FIG. 13) described later herein. In the illustration being described, the indicia means 14b generates a best color indicia (blue) 30 for very positive financial data (FIGS. 2 and 13), a good color indicia (green) 32 for good financial results, a cautious indicia (yellow) 34 for results which tend to indicate a financial problem or potential problem, and a bad indicia (red) 36 for bad results. Although not shown, a neutral indicia may be provided having a color which is different from the indicias 32–36. Notice also that the indicia means 14b causes visual objects 12b–12e to become color coded to provide an immediate visual indication of, for example, a company's financial performance compared to the various threshold formulas 28.

Figure 2:
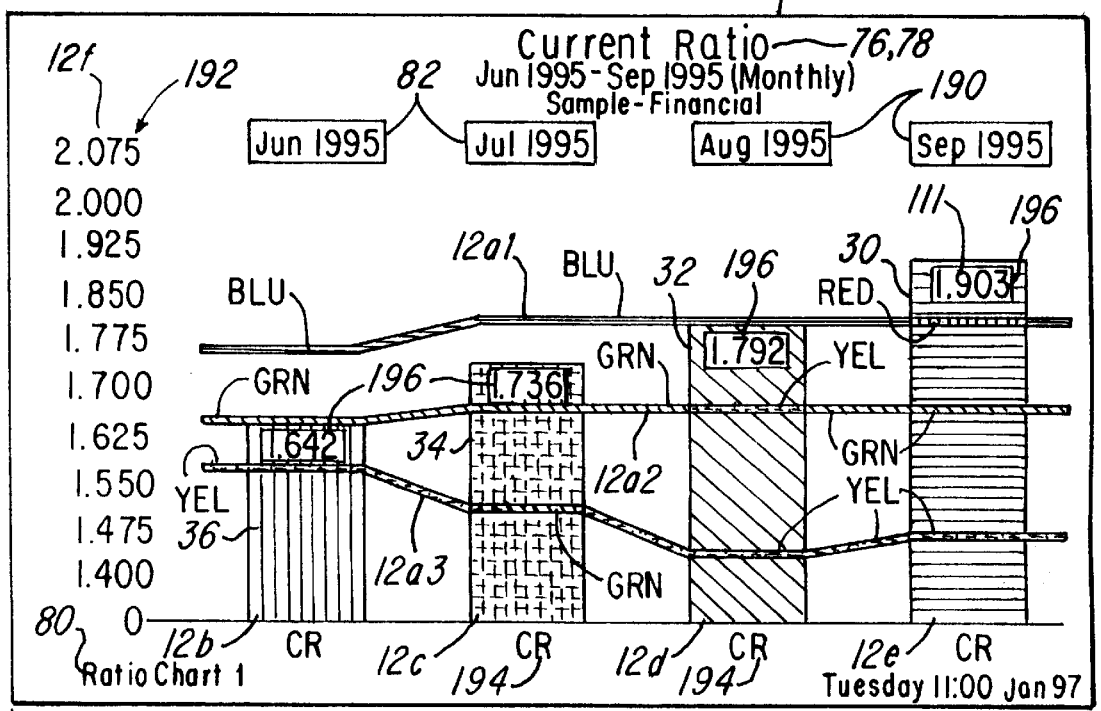
FIG. 2 is a plan view showing a chart, a legend and a spreadsheet generated in accordance with the system and method of the present invention.

Computer 14 further comprises a comparator line generator 14c (FIG. 1) for generating a comparator line, such as lines 12a1–12a3 in FIG. 1, for facilitating comparing actual data represented by color-coded visual objects, such as visual objects 12b, 12c, 12d and 12e (FIG. 2). In this regard, the comparator line generator 14c (FIG. 1) may utilize comparator values or formulas, such as formula 40 (FIG. 15), which are input by a user using an user interface screen 14a7 generated by user interface 14a of computer 14. Alternatively, the computer storage 18 (FIG. 1) may comprise a plurality of industry standard formulas or values (not shown) which may be electronically selected by the user using window 44 and used to generate one or more of the comparator lines 12a1–12a3.

FIG. 2 illustrates a typical intelligent, color-coded visual object chart 12 produced in accordance with this invention. Notice that the visual objects or visual objects 12b–12e are color-coded by indicia means 14b to provide a visual indication of, for example, a company's performance relative to the pre-established threshold values or formulas 28a–28c (FIG. 13) as described later herein. Notice also that the comparator line generator 14c of computer 14 generates the comparator lines 12a1–12a3. Notice that, at points where the comparator lines 12a1–12a3 bisect the visual objects 12b–12e, the lines 12a1–12a3 become horizontal (as viewed in FIG. 2). It has been found that this greatly enhances a user's ability to evaluate the information represented by a particular comparator line relative to the user's data represented by the visual objects 12b–12e.

The computer 14 comprises a routine or method 40 (FIG. 3) for generating the at least one intelligent chart 12 which begins when the operator electronically selects a launch sequence for generating the intelligent charts 12. At block 42 in FIG. 3, the user inputs or enters various user commands into computer 14 for selecting at least one of the following operations: a setup routine (FIG. 4); a display/graph chart routine (FIG. 5) or a data processing procedure (block 52 in FIG. 3) or an exit command.

Figure 3:
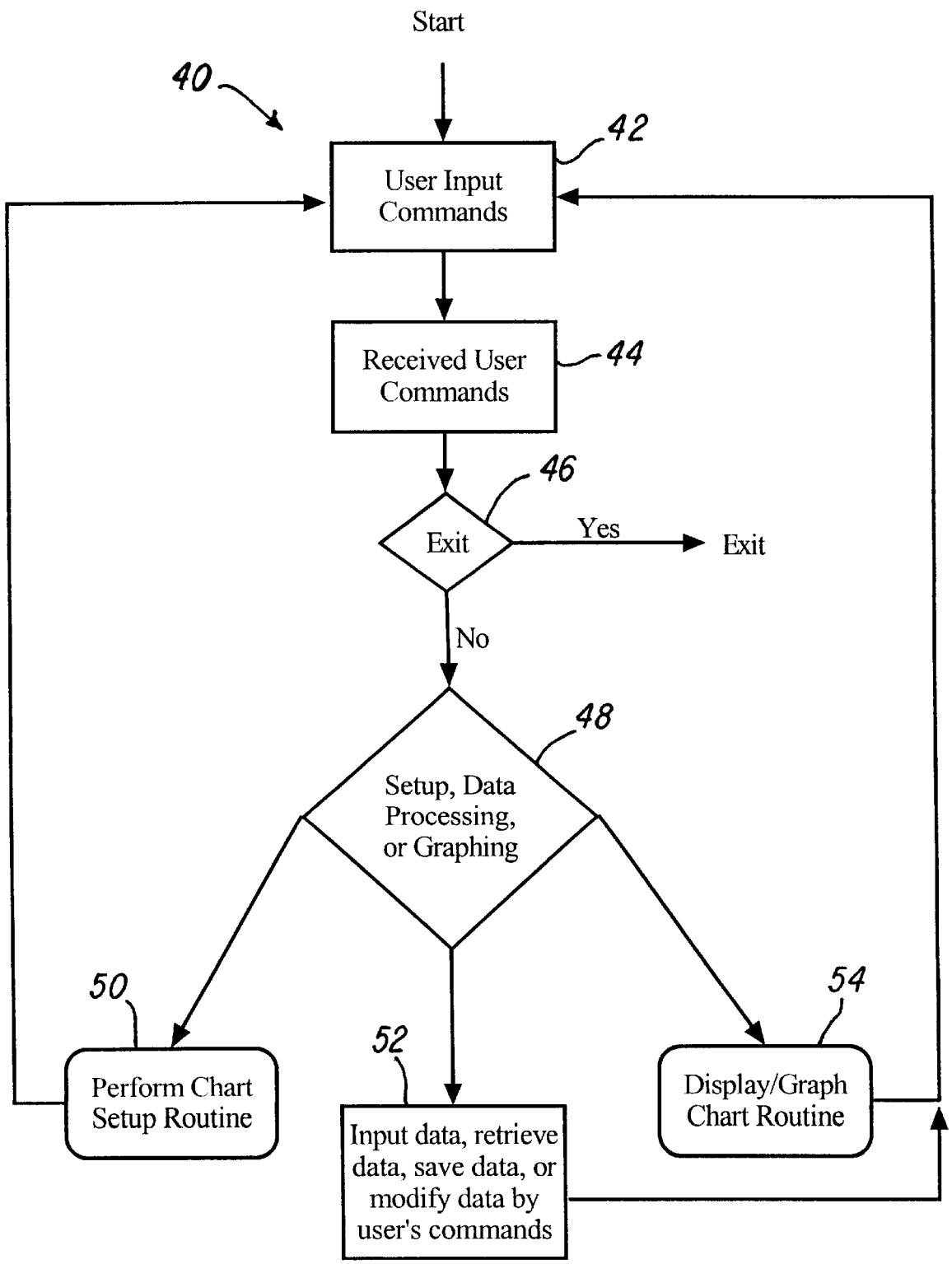
FIG. 3 is a schematic of a process routine in accordance with the present invention.

At block 44 in FIG. 3, computer 14 receives the user commands and if an exit command is received, then the routine exits (decision block 46). Otherwise, the routine proceeds to decision block 48 where computer 14 determines whether a chart setup routine (FIG. 4) was selected in which case the routine proceeds to block 50 and, thereafter, returns to block 42 as shown. If a display/graph chart command is received by computer 14, then the routine proceeds to block 54 whereupon computer 14 executes a display/graph chart routine (FIG. 5) and, thereafter, returns to block 42 as shown. If data processing is commanded by the user and received by computer 14, then computer 14 proceeds to block 52 and, thereafter, returns to block 42 as shown.

Figure 4:
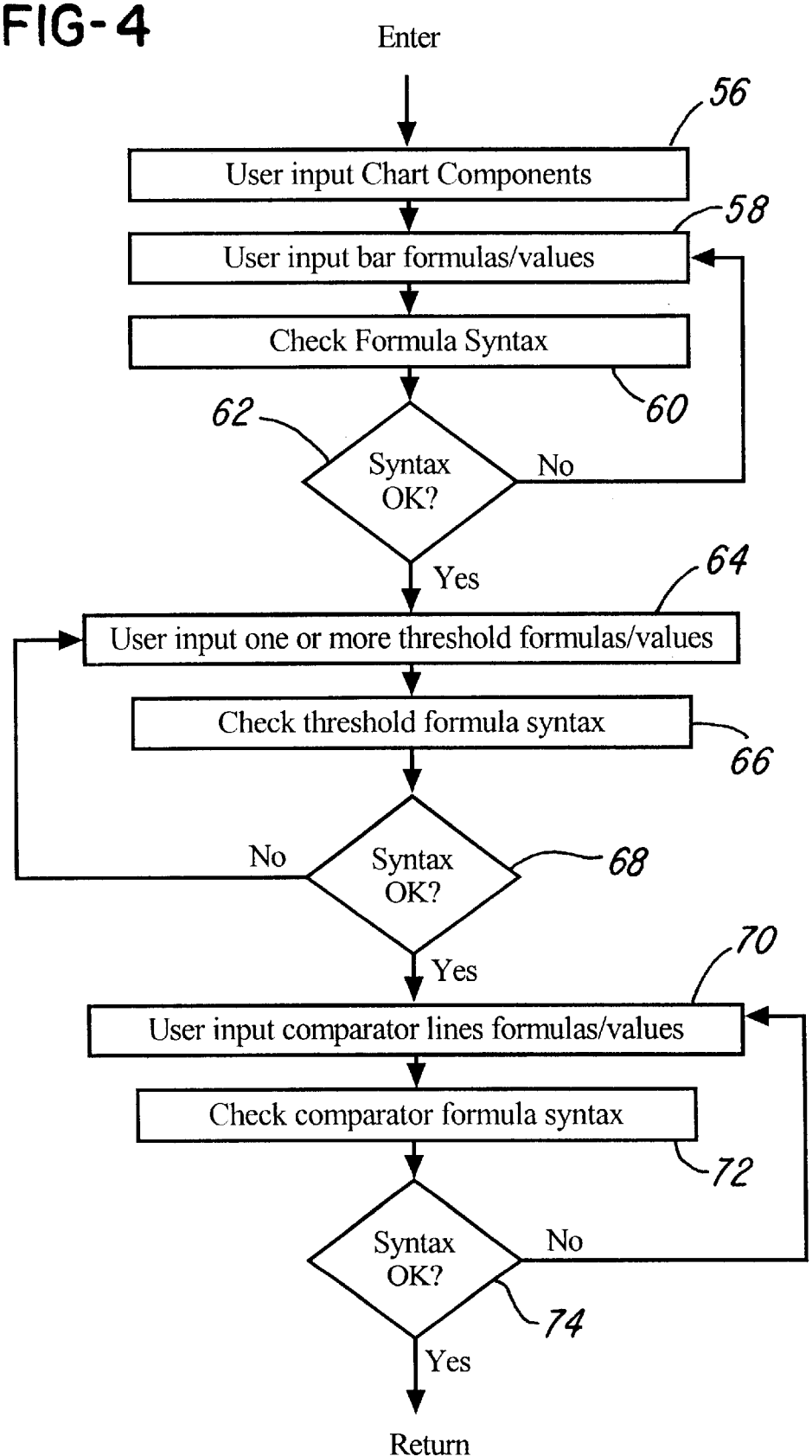
FIG. 4 is a schematic of a chart setup routine for inputting various components and formulas/values into a computer.

The chart setup routine referred to at block 50 in FIG. 3 is illustrated in FIG. 4 and begins by the user initializing or inputting various chart components at block 56. In the embodiment being described, the user interface 14a (FIG. 1) comprises the plurality of chart setup component interfaces, including interfaces 14a1 (FIG. 9), 14a2 (FIG. 10) and 14a3 (FIG. 11) for inputting various chart components or labels, such as a chart name for the chart to be generated 76 (FIG. 9), a heading name 78, a footer 80, a period selection 82 (FIG. 10), a visual object name identifier 84 (FIG. 11) for identifying a visual object in the chart, a legend title 86 for the visual object and a data type 88 for identifying the type of data represented by the visual object. As shown in the chart 12 in FIG. 2, the computer 14 uses one or more of these components 76–88 when generating the color-coded chart 12.

As shown in FIG. 4, the routine proceeds to block 58 where the user inputs various visual object formulas/values 92 using the user interface 14a4 shown in FIG. 12. Notice in FIG. 12 that the user has an opportunity to also input a visual object name 90, the visual object value or formula 92 or to utilize an existing formula 94 stored in storage 18 (FIG. 1). A plurality of electronic operands 91 may be provided when developing the formula. In the embodiment being described, the user must input visual object names before he can input the formulas 92. Also, computer 14 prevents use of the exact name 90 for more than one visual object.

In the embodiment being described, the existing formula 94 (FIG. 12) may comprise an industry standard formula, such as an industry standard current ratio (i.e., current assets divided by current liabilities), in order to facilitate generating the values or formulas. The interface 14a4 also comprises a summary account ledger 96 (FIG. 12) which provides a summary of the various account categories 97, such as assets, liabilities, income, cost of sales, expenses and the like, as may be used by the operator. Thus, it should be appreciated that if the operator wanted to display a chart comprising a visual object representing, for example, a company's current ratio for the periods 1995 and 1996, the visual object names, data types, formulas and other pertinent information for creating the chart would be input into computer 14 using the interfaces 14a3 and 14a4.

At block 60 in FIG. 4, the computer 14 utilizes a formula syntax verifier to verify the formula syntax.

At decision block 62, it is determined if the syntax is okay and if it is not, then the routine returns to block 58. Otherwise, it proceeds to block 64 where the user inputs one or more threshold formulas/values 28a, 28b or 28c utilizing the user interface 14a5 (FIG. 13).

The interface 14a5 comprises a visual object selector 98 for selecting the visual object of the visual object group, arithmetic operators 29 for use in creating or defining the formulas or values 28, an account ledger 95 similar to ledgers 96 in FIG. 12, and an indicia identifier for identifying whether an increase 33 or decrease 35 in the graph values generated by the formulas 28a–28c is preferential. Notice also that interface 14a5 comprises a plurality of legend title areas 35 for inputting legend titles, like the titles 37, 39, 41 and 43, which directly correspond to the color indicia 30–36, generated by indicia means 14b (FIG. 1).

Figure 15:
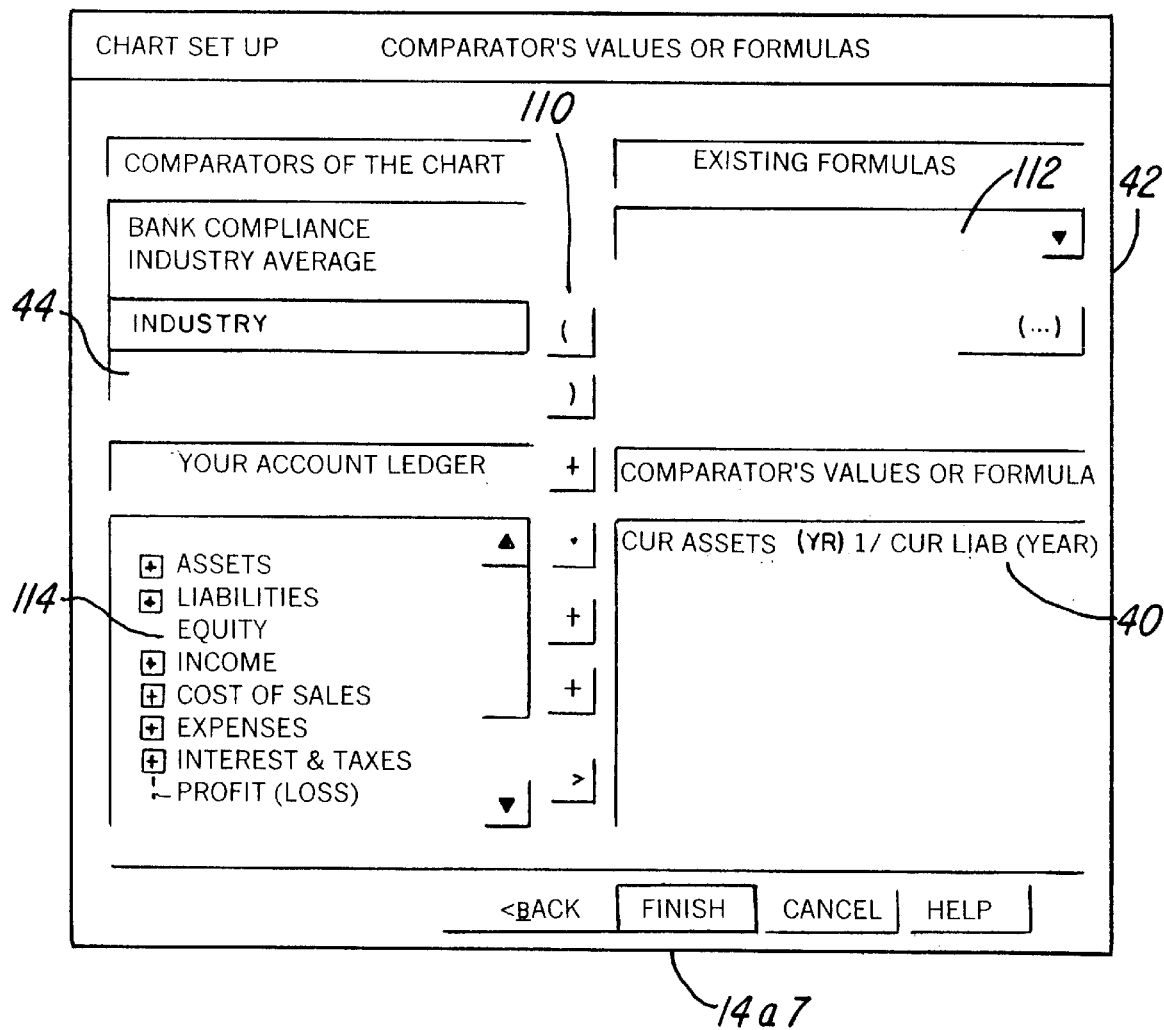
FIG. 15 is a plan view of another user interface for inputting comparator formulas/values into the computer.

At block 66 in FIG. 4, the formula syntax verifier 14d checks the formula syntax and if the syntax is not okay (decision block 68), then the routine returns to block 64 as shown. Otherwise, the routine proceeds to block 70 where the user continues the setup process using the user interfaces 14a6 (FIG. 14) and 14a7 (FIG. 15). In this regard, user interface 14a6 enables the user to input a comparator name, such as a year 100, and a comparator category or name which may be selected from a list 102 generated by computer 14. The interface 14a6 further permits the user to input a comparator legend title area 104 for optionally inserting a legends 102 which will be printed on the chart 12 as illustrated in FIG. 2. The interface 14a6 further comprises a color identifier 106 for enabling the operator to identify a color to be used to generate the comparator lines 12a1–12a3. It should be appreciated that these colors may be the same or different from the indicia generated by indicia means 14b in FIG. 1 for the visual objects 12b–12e.

Also, the user interface 14a6 comprises a data type entry area 108 for selecting the data type for the comparator line 12.

Figure 5:
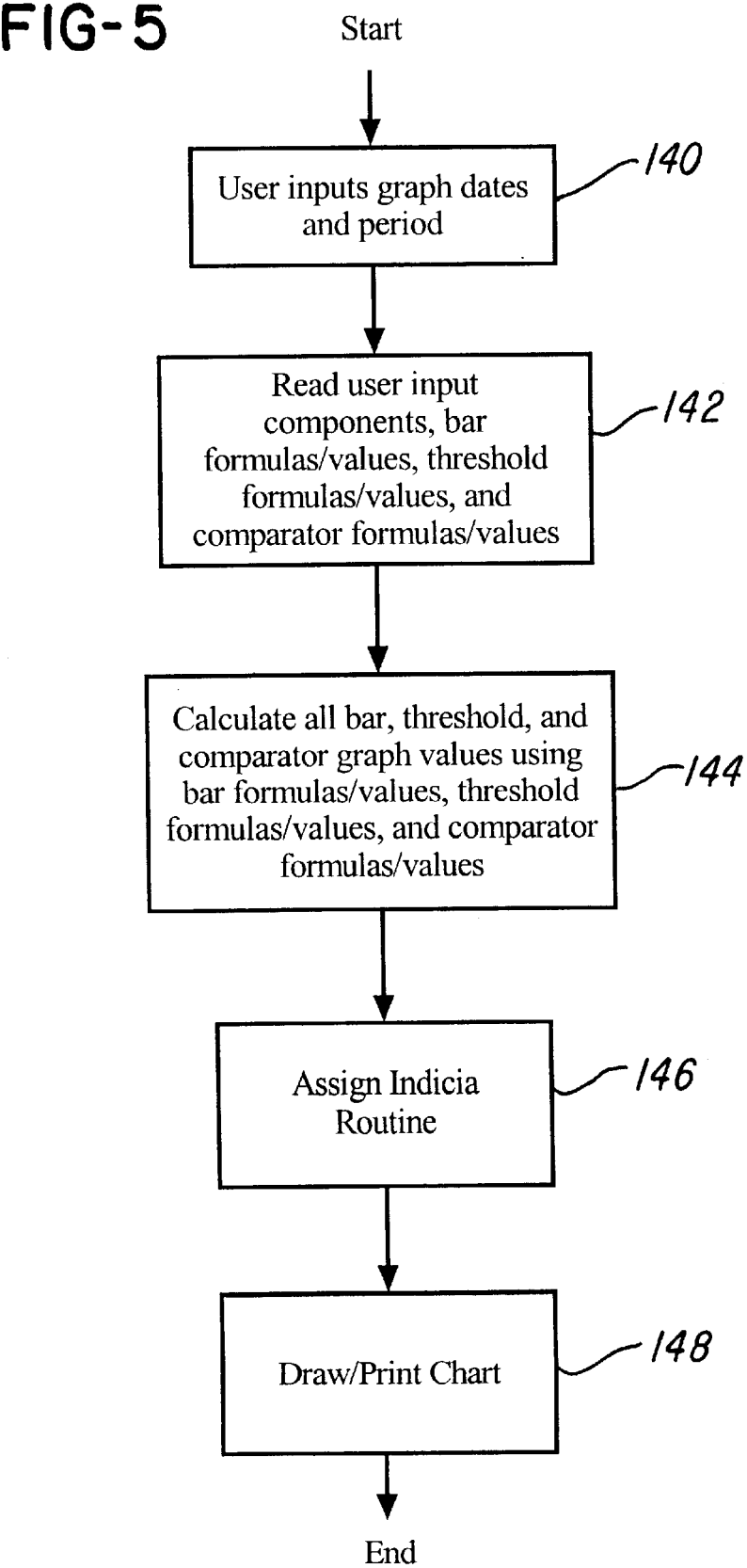
FIG. 5 is a schematic of a display/graph chart routine in accordance with the present invention.

The input of comparator information is continued with interface 14a7 (FIG. 15) where the comparators of the chart 12 are input into computer 14, and the comparator values or formulas 40 are input. The user interface 14a7 further comprises arithmetic operators 110 for facilitating entry of the formulas and an area 112 for selecting an existing formula resident on storage 18 (FIG. 1) coupled to computer 14. The interface 14a7 (FIG. 15) further comprises an account ledger area 114 for identifying and selecting an account title in the manner described earlier herein relative to interfaces 14a4 and 14a5 (FIGS. 5, 12 and 13). As mentioned earlier herein, the comparator values or formulas 40 may comprise a mathematical expression, such as a current ratio, or may simply be a numeric value which is used to generate the comparator lines 12a1–12a3 for purposes of comparing data represented by the visual objects 12b–12e, to a comparator, such as an industry standard or average, a desired goal or the like.

At block 72 in FIG. 4, the formula syntax verifier 14d (FIG. 1) verifies the syntax of the comparator formula 40 inputted by the user, and if it is not okay, then the routine returns to block 70 as shown. Otherwise, the routine returns to block 42 (FIG. 3) where the user may input another command.

It should be appreciated that, once the chart components and formulas are input, they can be interactively and selectively accessed using the interfaces 14a1–14a7 such that one or more of the aforementioned components can be changed, modified or deleted. Also, although the sequence of operation has been shown and described as above, it should be appreciated that the sequence is not restricted to this manner of operation and it could be performed in another sequence and still achieve the advantages of this invention. In the embodiment being described, a user first inputs a visual object name 90 and then inputs the object formulas/values 92. Also, the interactive user interfaces 14a1–14a7 enable the operator to perform the inputting of threshold, comparator and visual object component information, formulas/values and the like in any sequence that is convenient for the operator using a conventional mouse (not shown) and keyboard (not shown) coupled to computer 14.

If data processing is selected by the user at decision block 48 in FIG. 3, then the routine proceeds to block 52 where the user inputs data, retrieves data, saves data or modifies the data as may be desired, utilizing interface 14a8 (FIG. 8) generated by user interface 14a (FIG. 1) of computer 14.

At block 52, user interface 14a generates the user interface 14a8 (FIG. 8) to enable a user to input, retrieve, save or modify data, such as financial data 121 and 135 mentioned earlier. In this regard, the user selects or inputs a category, such as "assets" at window 120. The interface 14a8 further provides the electronic buttons 122, 124, 126, 128 and 130 mentioned earlier for updating, saving, cancelling or approving the information provided for a selected time period as identified or input into column areas 132 and 134. After the user has completed, retrieved, saved, updated or deleted the data using user interface 14a8 as desired, the process returns to block 42 (FIG. 3) where the routine is ready to receive another user command. If the display/graph chart routine is selected by the user at decision block 48, then the routine proceeds to block 54 whereupon the process proceeds to a chart routine where the intelligent chart 12 is displayed, printed, saved or the like. The display/graph chart routine will now be described relative to FIGS. 5–7.

Figures 9, 10:
FIG. 9 is a plan view of a user interface for inputting various chart setup components into the computer.
FIG. 10 is a plan view of a user interface for identifying multiple or single period charts.

The routine begins at block 140 (FIG. 5) where the user inputs graph dates and periods using the user interface 14a2 (FIG. 10). At block 142, computer 14 reads the input components input by user at block 56 in FIG. 4, visual object formula/values 92 (FIG. 12), thresholds formula/values 28a, 28b and 28c (FIG. 13) and comparator formula/values 40 (FIG. 15) at block 142.

The routine proceeds to block 144 where computer 14 processes the user data 121 (FIG. 8) applying the aforementioned components and formulas/values to generate visual object graph values, threshold graph values and comparator graph values, respectively, which will be used to generate the color-coded visual objects 12b–12e (FIG. 2) and comparator lines 12a–12c. For example, in the illustration being described, the computer 14 uses current assets and current liabilities data for September, 1995, as originally input by a user using user interface 14a8 (FIG. 8), and applies visual object formula 92 (FIG. 12) to calculate a current ratio graph value of 1.903 (item 111 in FIG. 2). Likewise, computer 14 uses the comparator line generator 14c (FIG. 1) to generate comparator lines 12a–12c.

Finally, computer 14 applies threshold formulas/values 28a–28c (FIG. 13) to determine threshold graph values (not shown) for use by indicia means 14b (FIG. 1) to properly identify or assign indicia to the resultant visual objects 12b–12e (FIG. 2).

After all graph values are determined at block 144 (FIG. 5) the routine proceeds to block 146 where an assign indicia routine begins. The assign indicia routine is represented at FIG. 6 and begins by comparing the visual object graph values obtained at block 144 in FIG. 5 and computer 14 compares these values to the threshold graph values which were also calculated at block 144 in FIG. 5. At this point, the indicia means 14b (FIG. 1) of computer 14 assigns the indicia 30–36 depending on the outcome of the comparison performed at block 160. Thus, in the example being illustrated a percentage of bank compliance current ratios (identified as "BC Current Ratio" in FIG. 13) is used to determine the desired thresholds. If the calculated current ratio for a given period was ten percent over a bank compliance current ratio (i.e., threshold formula 28a in FIG. 13), then indicia means 14b of computer 14 assigns the best indicia 30 (FIG. 2), such as the color blue, at block 162 in FIG. 6.

Likewise, if the actual current ratio calculated by computer 14 is between five to ten percent over a bank compliance current ratio (formula 28b in FIG. 13), then the indicia means 14b assigns a good indicia 32 (block 166 in FIG. 6), such as the color green. In a similar manner, the cautious indicia (block 168), such as yellow, bad indicia (block 170), such as red, or a neutral indicia (block 172) is assigned or used to create visual objects 12b–12e (FIG. 2).

In the embodiment being described, the indicia assigned at blocks 162, 166, 168, 170 and 172 are colors in the form of blue, green, yellow, red and white, respectively. It should be appreciated, however, that the indicia could comprise any means for visually identifying and distinguishing one visual object, such as visual object 12b in FIG. 2, from adjacent visual objects, such as visual objects 12c–12e. For example, dashed lines, cross-section lines, flags, backgrounds or other distinguishing markings may be used as the indicia applied by indicia means 14b (FIG. 1).

After the indicia are assigned, computer 14 records or stores the indicia (block 74 in FIG. 6) in storage 18 (FIG. 1). Thereafter, the routine is complete and the display/graph chart routine proceeds to block 148 (FIG. 5) where the chart is created using draw/print chart routine described relative to FIG. 7. This routine begins at block 180 where computer 14 draws or prints the background 12f (FIG. 2) comprising the heading 78 and footing 80 which were identified on the user interface 14a1 (FIG. 9), the visual object period titles 82 and 190 (FIG. 2) which are generated by computer 14, and the scales/axis labels 192 and 194 for identifying the X axis and Y axis for the chart 12.

At block 182 (FIG. 7), the visual objects 12b–12e are created, drawn or printed onto background 12f. At block 184, computer 14 generates the comparator lines 12a1–12a3 using the comparator line generator 14c (FIG. 1) which the user identified using interface 102 (FIG. 14). Notice in FIG. 2 that at points where comparator lines 12a1–12a3 intersect a visual object 12b–12e, computer 14 causes the lines 12a1–12a3 to be horizontal (as viewed in FIG. 2) to facilitate accurate interpretation of the data represented by the visual objects 12b–12e. To further facilitate reading the comparator lines 12a1–12a3, comparator line generator 14c generates comparator lines 12a1–12a3 to comprise substantially different colors of the visual objects 12b–12e at points where the comparator lines 12a1–12a3 intersect the visual objects 12b–12e, as shown in FIG. 2, and when the values represented by the visual objects 12b–12c are the same as the values represented by the lines 12a1–12a3.

In the embodiment being described, the values represented by the visual objects 12b–12e and lines 12a1–12a3 may be a currency, a ratio, a percentage or a number. If the comparator lines 12a1–12a3 represent the same value type, then they are comparable. This has been found to enable the user to quickly read and interpret charts 12b–12e.

At block 186 (FIG. 7), computer 14 draws or prints value labels 196 (FIG. 2) for providing a numeric representation of the data represented by each visual object 12b–12e. Notice again that for ease of visualization and to facilitate interpreting the data represented by the visual objects 12b–12e, the labels 196 are placed inside each visual object 12b–12e, as shown in FIG. 2.

At decision block 188 (FIG. 7), it is determined if the graph/print chart cycle is complete and if it is, then the routine ends, otherwise it proceeds to block 190 where another chart (not shown) may be generated by computer 14.

Once all charts 12 requested by the user are generated by computer 14, they may be displayed on monitor 24 or printed on paper, transparency or other medium by printer 16 or stored in storage 18. Moreover, the images may be transmitted over the local area network 22 to another network (not shown), to another computer (not shown), or over the Internet, for example, via modem 20.

Advantageously this system and method provides means for generating intelligent indicia-coded charts which quickly show compliance with predetermined thresholds and comparison to comparator lines representing, for example, industry standard data. Moreover, the intelligent chart 12 facilitates quickly reviewing and interpreting the data represented by the chart 12.

Moreover, the system and apparatus of the present invention stores and recalls all formulas 92, 28a, 28b, 28c and 40, rather than numeric values. The numeric values needed for displaying and printing the chart 12 will be calculated at run time. This makes the system and method of the present invention a useful tool for live chart 12 demonstration and observation, problem spotting, instantaneous creation, history data, tracking and the like. Thus, the chart 12 can be set up in advance of inputting data. In contrast, conventional charting processes require all values (ratios, percentages, dollar amounts, etc.) in numeric form before the chart is set up.

Computer 14 may also generate a corresponding spreadsheet 13 (FIG. 2) having columns of data 13b–13e corresponding to the visual objects 12b–12e, respectively. In the embodiment being described, all participants involved in the calculation of the visual object are detailed. Thus, for example, if the visual object 12b–12e is representing a current ratio, then the components of the current ratio, current assets and current liability are participants of the calculation of the visual object, and they are listed, as well as the current ratio, automatically by computer 14 on the spreadsheet 13. In the embodiment being described, indicia means 14b generates the color codes 30', 32', 34' and 36' adjacent one or more data values, such as values 15b, 15c, 15d and 15e as shown. This further facilitates providing convenient and indicia-coded spreadsheet 13 having indicia corresponding with the chart 12 to facilitate quick association, interpretation and identification of the data listed on the sheet 13.

Although the above illustration shows the system and method applied to a company's financial data, it should be appreciated that the system and method could be used with non-financial data as well.

While the methods herein described, and the apparatus and forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A method for creating at least one intelligent chart comprising the steps of:
    inputting a plurality of chart components comprising at least one of the following: a chart name, a chart footing or a chart heading, a bar name, a legend title for a legend for the bar;
    inputting data to be charted;
    inputting a plurality of bar values and a plurality of threshold values for said at least one intelligent chart;
    assigning intelligent indicia to each of said plurality of threshold values;
    generating said at least one intelligent chart comprising a plurality of indicia-coded bars which are coded using said intelligent indicia with each of said plurality of indicia-coded bars being assigned an intelligent indicia in response to a comparison of at least one of said plurality of bar values to said plurality of threshold values; and
    wherein the plurality of threshold values are employed in assigning said intelligent indicia to each of said indicia coded bars.

2. The method as recited in claim 1 wherein said method further comprises the step of:
    inputting a comparator line value;
    generating a comparator line on said at least one intelligent chart; said comparator line traversing said at least one of said plurality of indicia-coded bars on a side of and substantially perpendicular to said at least one of said plurality of indicia-coded bars.

3. The method as recited in claim 1 wherein said intelligent indicia comprises at least one of a plurality of colors.

4. The method as recited in claim 1 wherein said method further comprises the steps of:
    processing said user data using at least one of said plurality of bar values and at least one of said plurality of threshold values to provide graph values and said threshold values, respectively;
    comparing said graph values to said threshold values;
    assigning said intelligent indicia in response to said comparison step.

5. The method as recited in claim 1 wherein said generating step further comprises the step of:
    generating said at least one intelligent chart on either a transparency or a paper sheet.

6. The method as recited in claim 2 wherein said method further comprises the step of:
    generating said comparator line using a predetermined color;
    changing said predetermined color at points where said comparator line traverses said at least one of said plurality of indicia-coded bars.

7. The method as recited in claim 1 wherein said generating step further comprises the step of:
    printing a background;
    printing said plurality of indicia-coded bars on said background;
    printing at least one comparator line through at least one of said plurality of indicia-coded bars.

8. The method as recited in claim 1 wherein said plurality of indicia-coded bar values and said plurality of threshold values may comprise at least one formula.

9. A method for electronically generating at least one intelligent color-coded chart, said method comprising the steps of:
    inputting user data into a processor;
    loading a plurality of bar formulas and threshold ranges for said at least one intelligent color-coded chart into said processor;
    assigning a color to each of said plurality of threshold ranges;
    processing said input data using said plurality of bar formulas to provide a plurality of graph values;
    comparing said plurality of graph values to said threshold ranges;
    generating said intelligent color-coded bar chart wherein said color-coded bar chart comprises a plurality of bars each having said color assigned in response to said comparing step; and
    wherein the plurality of threshold values are employed in assigning said intelligent indicia to each of said indicia coded lines.

10. The method as recited in claim 9 wherein said loading step further comprises the step of:
    loading a plurality of financial data formulas into said processor.

11. The method as recited in claim 9 wherein said inputting step further comprises the step of:
    inputting financial data as said user data into said processor.

12. The method as recited in claim 9 wherein said method further comprises the step of:
    inputting a comparator line value;
    electronically situating a comparator line on said at least one intelligent chart;

said comparator line traversing at least one of said plurality of indicia-coded bars substantially perpendicular to a side of said at least one of said plurality of indicia-coded bars.

13. The method as recited in claim 9 wherein said assigning step further comprises the step of:

assigning a plurality of color indicia comprising at least one of the following: a best color indicia, a good color indicia; a cautious indicia, a bad indicia or a neutral indicia.

14. The method as recited in claim 9 wherein said user data comprises financial data, said method further comprising the steps of:

processing said financial data using said visual object values and said threshold values to provide graph values and said threshold values, respectively;

comparing said graph values to said threshold graph values;

assigning said color to said plurality of visual objects in response to said comparison step.

15. The method as recited in claim 9 wherein said generating step further comprises the step of:

generating at least one intelligent chart on either a transparency or paper sheet.

16. The method as recited in claim 12 wherein said method further comprises the step of:

generating said comparator line using a predetermined color;

changing said predetermined color at points where said comparator line intersects at least one of said visual objects.

17. The method as recited in claim 1 wherein said generating step further comprises the step of:

printing a background;

printing said plurality of indicia-coded visual objects on said background;

printing at least one comparator line through at least one of said plurality of visual objects.

18. The method as recited in claim 9 wherein said plurality of threshold ranges are defined by at least one financial formula.

19. A system for electronically generating at least one intelligent color-coded bar chart, said system comprising:

a computer;

a user interface for inputting user data into said computer;

a storage device coupled to said computer for storing a plurality of bar formulas and a plurality of threshold formulas;

indicia means situated in said computer for assigning at least one color to a plurality of threshold ranges defined by said plurality of threshold formulas;

said computer processing said user data using said plurality of visual object formulas to provide a plurality of graph values and comparing said plurality of graph values to said plurality of threshold ranges for said at least one intelligent color coded bar chart and also generating said at least one intelligent color-coded bar chart in response thereto wherein said at least one intelligent color-coded bar chart comprises a plurality of bars each being defined by said at least one color; and wherein the plurality of threshold values are employed in assigning said intelligent indicia to each of said indicia coded bars.

20. The system as recited in claim 19 wherein said user interface comprises a visual object formula user input interface for loading said plurality of visual object formulas into said computer.

21. The system as recited in claim 19 wherein said user data comprises financial data.

22. The system as recited in claim 19 wherein said system computer further comprises:

comparator line generating means for situating a comparator line on said at least one intelligent color-coded visual object chart such that it intersects at least one of a plurality of indicia-coded visual objects in a substantially perpendicular manner.

23. The system as recited in claim 19 wherein said at least one color defines at least one of the following: a best color indicia, a good color indicia; a cautious indicia, a bad indicia or a neutral indicia.

24. The system as recited in claim 19 wherein said computer comprises means for generating either an electronic or printed image of said at least one intelligent chart.

25. The system as recited in claim 19 wherein said computer further comprises:

a comparator line generator for generating said comparator line using a predetermined color and for changing said predetermined color at points where said comparator line bisects at least one visual object on said at least one intelligent chart.

* * * * *